(12) United States Patent
Shafer

(10) Patent No.: US 6,450,535 B1
(45) Date of Patent: *Sep. 17, 2002

(54) BOOK FOR HOLDING PRODUCTS SUCH AS COMPACT DISCS AND METHOD OF MAKING THE SAME

(75) Inventor: Steve Shafer, McAllen, TX (US)

(73) Assignee: R. R. Donnelley & Sons Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/551,357

(22) Filed: Apr. 18, 2000

Related U.S. Application Data

(60) Provisional application No. 60/133,120, filed on May 7, 1999.

(51) Int. Cl.[7] ................................................. B42D 5/00
(52) U.S. Cl. .................... 281/38; 40/726; 206/308.1; 206/473; 281/15.1; 281/21.1
(58) Field of Search ............................. 206/308.1, 311, 206/312, 472, 307, 307.1, 387.13; 281/38, 22, 15.1, 21.1, 29, 35, 36, 37, 473; 40/726

(56) References Cited

U.S. PATENT DOCUMENTS

| | | | | |
|---|---|---|---|---|
| 403,113 A | * | 5/1889 | Keller | |
| 715,162 A | * | 12/1902 | Schwartz | |
| 784,477 A | | 3/1905 | Dean | |
| 1,778,766 A | | 10/1930 | McMichael | |
| 2,544,568 A | | 3/1951 | Shepherd | |
| 3,549,225 A | * | 12/1970 | Scaccia | 312/10 |
| 3,920,267 A | * | 11/1975 | Lyon, Jr. | 281/16 |
| 3,972,632 A | * | 8/1976 | Carter | 402/46 |
| 4,104,071 A | * | 8/1978 | Crissy | 96/41 |
| 4,184,218 A | * | 1/1980 | Hawkes | 11/1 AD |
| 4,375,925 A | * | 3/1983 | Grummich | 402/15 |
| 4,586,729 A | * | 5/1986 | Beylerian | 281/5 |
| 4,932,679 A | | 6/1990 | Mayer et al. | |
| 5,076,611 A | | 12/1991 | Bouton | |
| 5,127,879 A | * | 7/1992 | Schubert | 462/2 |
| D332,005 S | * | 12/1992 | Walasek | 206/307 |
| 5,188,228 A | * | 2/1993 | Barrett | 206/310 |
| 5,193,851 A | | 3/1993 | Honegger | |
| 5,437,476 A | * | 8/1995 | Hutchinson | 281/15.1 |

(List continued on next page.)

FOREIGN PATENT DOCUMENTS

| | | | |
|---|---|---|---|
| WO | WO 97/39965 | * | 10/1997 |

Primary Examiner—A. L. Wellington
Assistant Examiner—Monica Carter
(74) Attorney, Agent, or Firm—Fitch, Even, Tabin & Flannery

(57) ABSTRACT

A compact disc storage book is formed with board book pages having pockets therein to receive compact discs. The board book is comprised of folded, printed signatures adhered to one another. A hard cover is attached to and covers the pages to protect the pages and compact discs from damage or contamination. The board book has an expandable spine, which increases its size or thickness from its smaller empty size to its larger, filled size when filled with compact discs. In the preferred method of making this storage book, the signatures have been printed and slit to form the CD receiving pockets prior to being folded on a signature folding machine. The folded signatures are fed by feeders of a signature gathering machine in proper sequence onto a gathering conveyor. The signature gathering machine has a programmable glue applicator to form the glue pattern including the glue pattern for the accordion fold, expandable backbone for the book form. The outer protective cover is attached, preferably by adhering the outer book form pages to facing sides of the casing cover.

14 Claims, 7 Drawing Sheets

U.S. PATENT DOCUMENTS

| | | | |
|---|---|---|---|
| 5,501,540 A | * 3/1996 | Ho | 402/73 |
| 5,513,749 A | * 5/1996 | Simmons | 206/308.1 |
| 5,575,505 A | * 11/1996 | Bridges | 281/29 |
| 5,620,271 A | * 4/1997 | Bergh et al. | 281/38 |
| 5,655,866 A | 8/1997 | Bellanca | |
| 5,669,491 A | * 9/1997 | Pettey | 206/232 |
| 5,690,220 A | * 11/1997 | Swan | 206/308.1 |
| 5,713,605 A | * 2/1998 | Pace et al. | 281/38 |
| 5,779,423 A | * 7/1998 | Bermingham | 281/29 |
| 5,893,585 A | * 4/1999 | Worthen | 281/45 |
| 5,915,549 A | * 6/1999 | Palmer et al. | 206/308.1 |
| 5,996,785 A | * 12/1999 | Palmer et al. | 206/308.1 |
| 6,092,650 A | * 7/2000 | Budnik | 206/232 |
| 6,273,471 B1 | * 8/2001 | Zanardi | 281/2 |
| 6,279,739 B1 | * 8/2001 | Moore et al. | 206/308.1 |

* cited by examiner

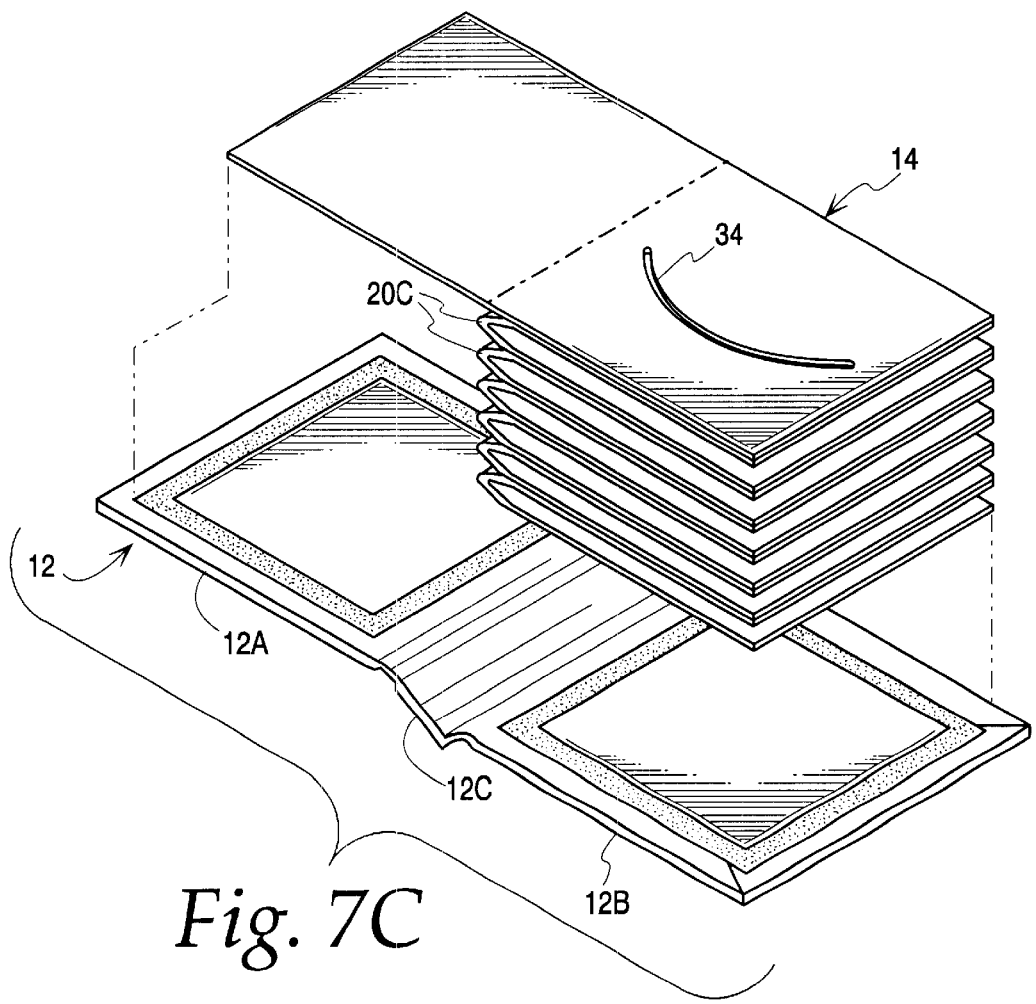
*Fig. 7C*
*Fig. 8*
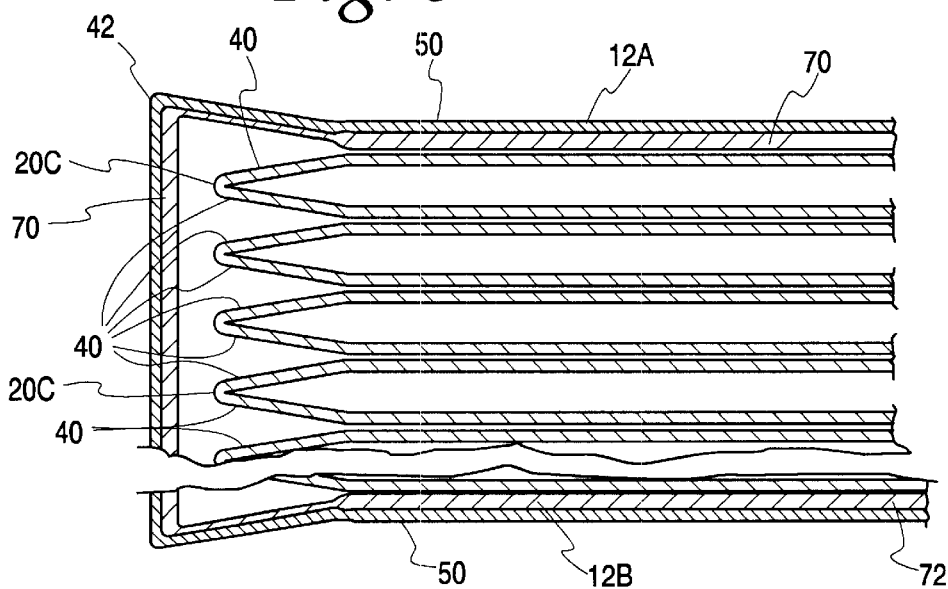

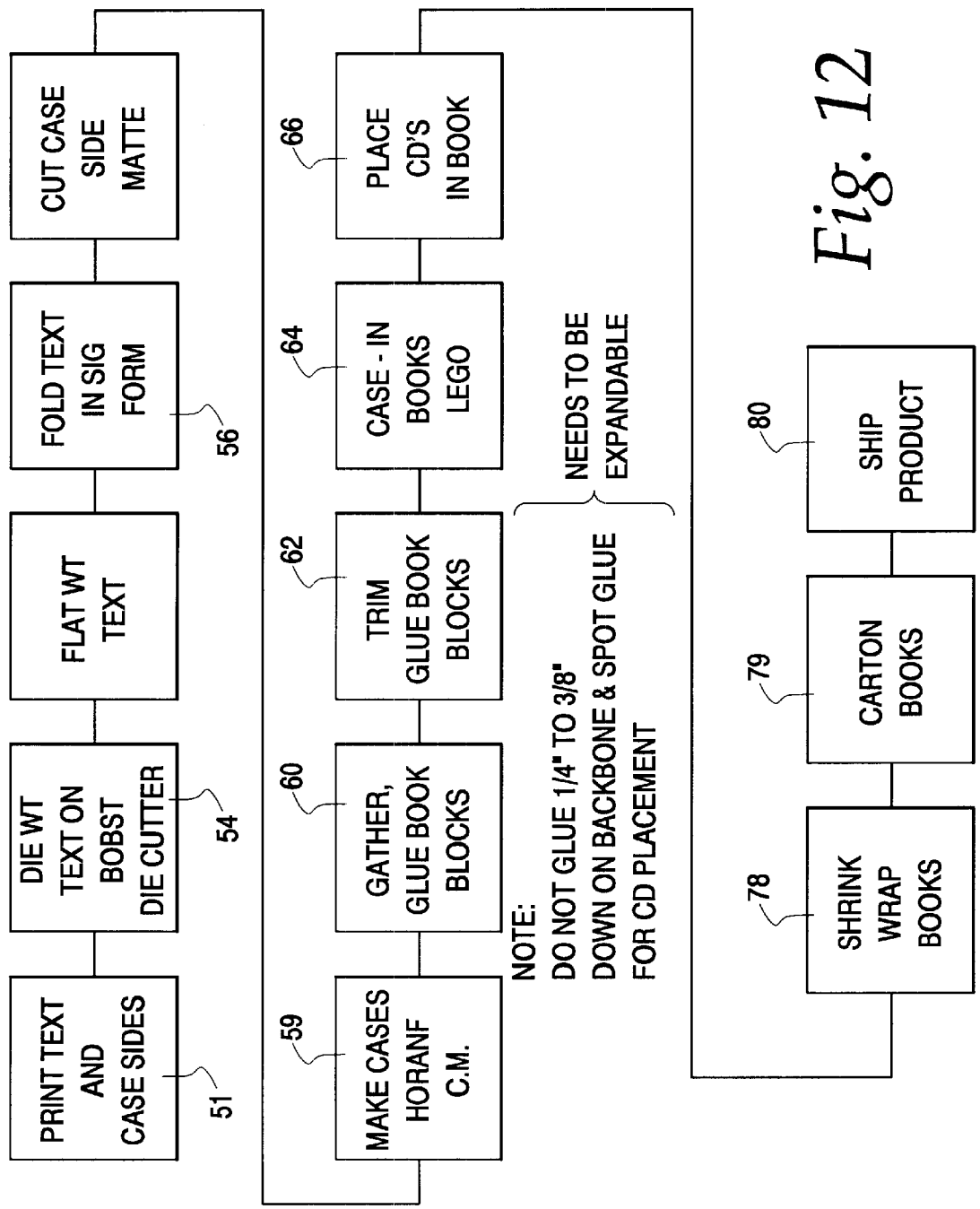

BOOK FOR HOLDING PRODUCTS SUCH AS COMPACT DISCS AND METHOD OF MAKING THE SAME

This application claims the benefit of 60/133,120 filed May 7, 1999.

FIELD OF THE INVENTION

This invention relates to making a book for holding a plurality of compact discs or other products in pockets on pages of the book, and to the method of manufacturing the same.

BACKGROUND OF THE INVENTION

Compact discs are stored in a wide variety of manners; and there is a need for an improved method of storing the compact discs so that they are protected from being damaged and from damaging foreign material. Also, there is a need for storing and for presenting a series of compact discs on the same subject matter or course of instruction with printed instructions and information relative to the use of the CDs. For music compact discs, it is often desired to provide some printed text explaining the music on the compact disc or providing information about the disc being stored. Compact discs are often intended to be used in a particular sequence or to be stored at a particular location, which allows use of an index to locate quickly the desired compact disc for removal from storage.

Many of common storage devices for compact discs are expensive and rather bulky. There is a need for inexpensive compact disc storage which stores cassettes in a very small storage space. Often storage space is at a premium in retail stores selling the compact disc book or is worth a premium when shipping the compact disc book to a purchaser.

SUMMARY OF THE INVENTION

In accordance with the present invention, a compact disc storage book is formed with pages having pockets therein to receive and store products such as compact discs therein. The preferred compact disc storage books have text or indicia on the pages thereof with slits in the pages to form an entrance to a pocket defined between adjacent signature sheets defining one board book page.

In accordance with an important aspect of the invention, the compact disc book is a board book comprised of folded signatures adhered to one another to form a book of board pages which can be opened to allow access to the discs being carried in pockets in the respective board pages. The term "board pages" is intended to mean thicker pages than the usual thin sheet of a magazine, such as the thick board pages often used for children's books for very young children. Typically, children's board books are for children too young to read and carry pictures of animals for the children to identify—i.e., cartoon books such as Barney or stories such as Dr. Seuss or the like. The thickness of the board book pages provides the strength and stability to support a CD and, preferably, a hard cover is provided to protect the pages and CDs from being damaged or crushed and to avoid contamination by dirt, dust, liquids, etc.

The present invention provides an expandable binder or spine for the book to allow the book to increase in shape as CDs are placed into the board book. Conversely, the size of the board book has a reduced thickness prior to introduction of CDs or after removal of the CDs from the board book.

The board book provides an inexpensive book with printed text and illustrations as well as a decorative cover. For example, if a particular course of instruction is stored on the CDs, the board book cover will have advertising informing the purchaser of the course and materials inside. The individual board pages also carry text and/or illustrations to assist the user in understanding the associated compact disc being stored and also to locate the disc at a specific, associated page for storage after use of the disc.

Preferably, these compact disc board books are made inexpensively using signature folding machines and signature gathering machines, which also apply adhesive in predetermined patterns to cause the signatures to be attached to one another to form the book block, but leaving unadhered pockets to receive a disc between adjacent sheets of a board page. Also, the signature folds at the backbone are not glued together so that the folded portions may expand or contract to provide an accordion-like backbone to allow expansion with insertion of the CDs into the CD pockets. The entry into the pockets is preferably a slit in one sheet that allows the lower portion or half of the CD to be inserted into the pocket while the upper, remaining portion or half of the CD is exposed and is outside of the pocket. The illustrated slit is arcuate with a central, lower point between equally-spaced upper, outer edges of the slit.

In accordance with the preferred method of making the CD books, signature handling equipment is used with the signatures having been printed prior to being folded, and with signatures slit on a die cutting machine. The slit, printed signature is fed into a signature folding machine to make a folded signature. The respective folded signatures are delivered to associated feeders of the gathering machine, which feeds sequentially the respective folded signatures in proper sequence onto a gathering conveyor. The preferred signature gathering machine also has a programmable gluing or adhesive applicator that allows a specific adhesive pattern to be established in order to form the CD pocket and to form the accordion, expandable backbone for the book form. The gathered pages are pressed together to adhere the pages to make the book form. Then, the cover is attached, preferably by adhering the outer sides of the book form pages to adjacent, inner facing sides of a casing or cover. The preferred cover also has an expandable, foldable spine to allow expansion as the CDs are being loaded into the pockets in the board pages, and the backbone of the board book is being expanded. Herein, the illustrated, expandable cover spine is formed by a first and second pair of adjacent, parallel fold lines in the cover. The preferred cover also is of a thick board material, which is thicker than signature board material; and it has an outer, printed signature mounted thereon and adhered thereto to provide a very decorative, outer appearance for assistance in marketing the book to purchasers.

BRIEF DESCRIPTION OF THE DRAWINGS

FIG. 7C is an exploded view showing the cover and adhesive for attaching the cover to the outer pages of the book block;

FIG. 8 is an enlarged, fragmentary, sectional view of the expandable backbone formed of folded portions of folded signatures without adhesive applied thereto;

FIG. 12 is a block diagram illustrating a process for making the CD book of FIG. 3, and then for shipping the CD books in a carton.

DETAILED DESCRIPTION OF THE PREFERRED EMBODIMENT

Figure 6:
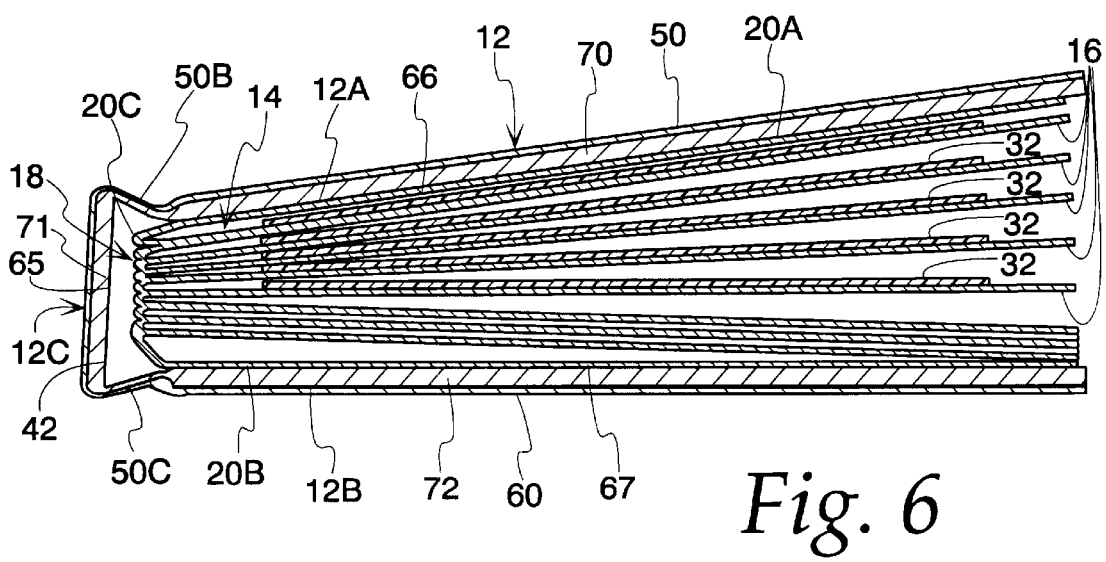
FIG. 6 is a cross-sectional view through the book showing some pages having CDs in pockets and other pages without a CD in a pocket.
Figure 7A:
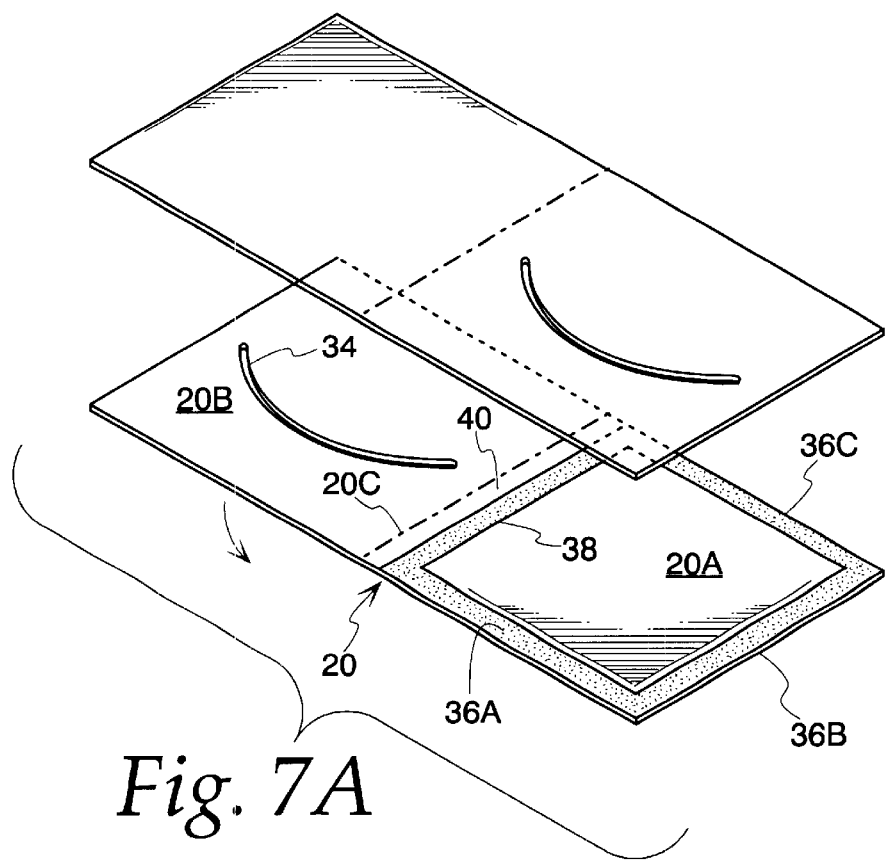
FIG. 7A is an exploded view showing adjacent signatures and a glue pattern thereon for attaching the signatures to one another.
Figure 7B:
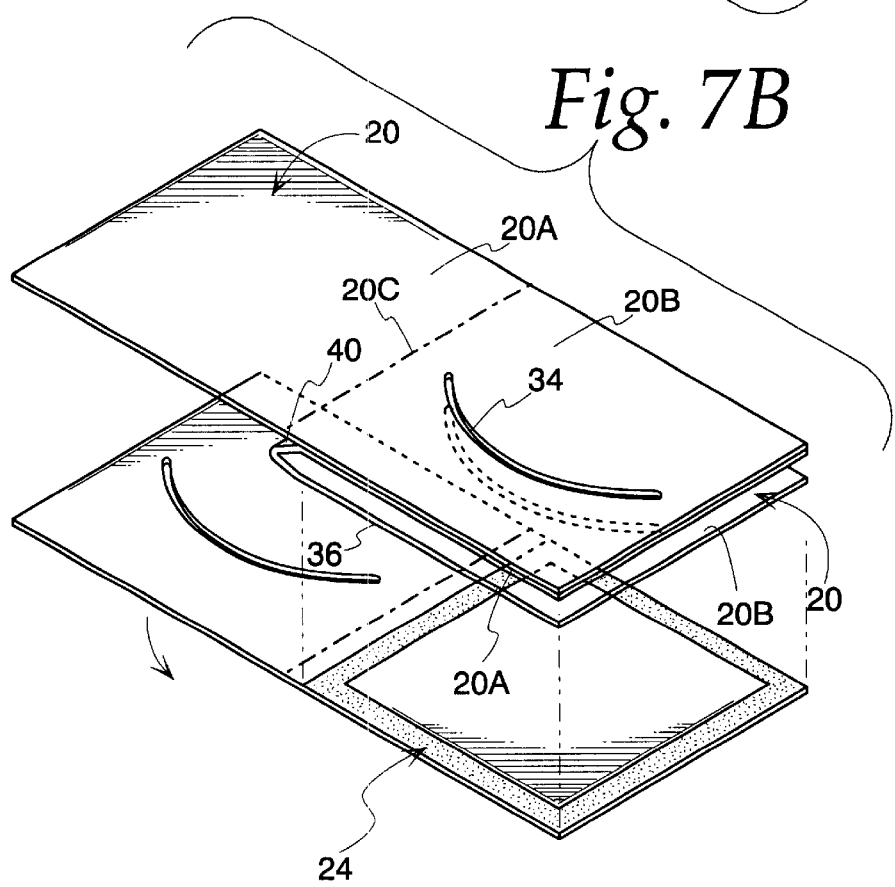
FIG. 7B is an exploded view of three signatures being joined together into the book block.
Figure 9:
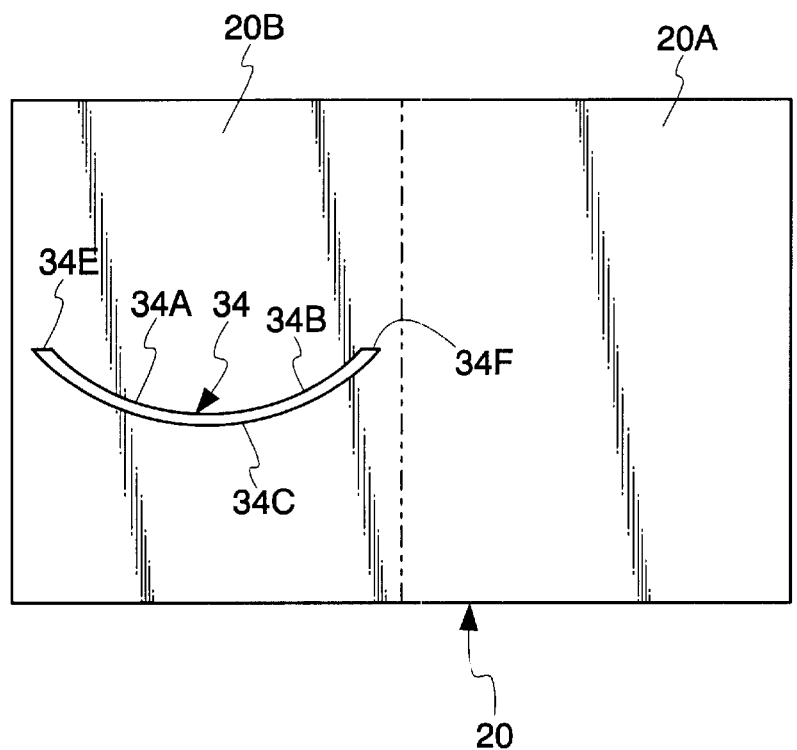
FIG. 9 is a view of a signature having received a slot therein at a die cutting station.
Figure 10:
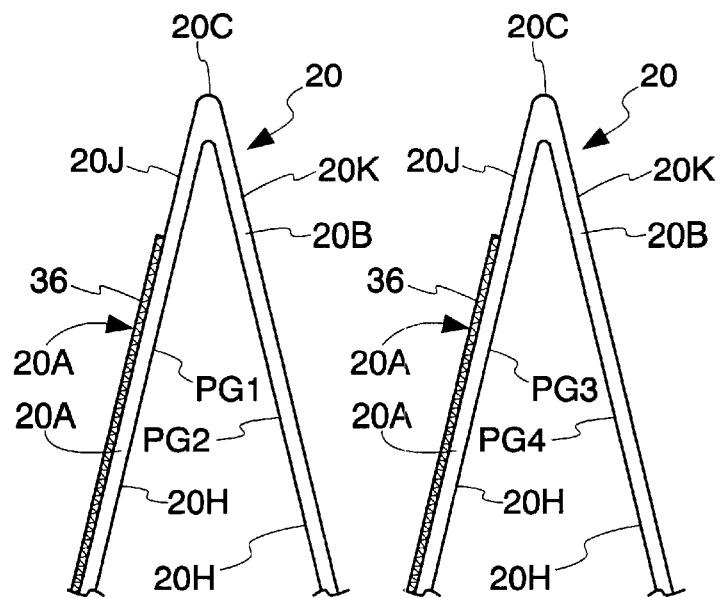
FIG. 10 is a view of adjacent folded signatures and adhesive for adhering the signatures together.
Figure 11:
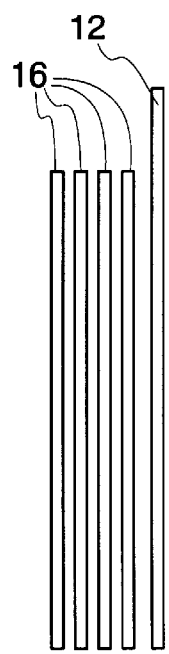
FIG. 11 is a view of a signature block and a cover being wrapped about the book block.

As shown in the drawings, for purposes of illustration, the invention is embodied in a book 10 of the board-book kind having an outer cover 12 and an interior book block 14 of individual board book pages 16. The cover comprises a front cover 12a and a rear cover 12b, as best seen in FIG. 6, and a spine 12c which covers an interior backbone 18 for the book block 14. The book block is formed of board pages 16 which are of double thickness in that they each comprise a pair of signature sheets 20a and 20b, which have been folded from the flat signature sheet 20 (shown in FIG. 9) into folded signatures with a central fold or fold line 20c. As best can be understood from viewing, FIGS. 7A, 7B and 10, the sheet 20a of a first signature 20 is adhered to a sheet 20b of an adjacent, second signature by an adhesive or glue 24 applied in a predetermined pattern. The folded signatures are fed from feed hoppers of a signature gathering machine while in a folded V-shape (as shown in FIG. 10) with the adhesive 24 applied to the signature sheet 20b as it is fed from the feed hopper; and upon contact with the signature sheet 20a of an adjacent signature gathered on the gathering machine, the adjacent signature sheets 20a and 20b are adhered to one another and are later pressed together to form the board block page 16 comprised of adhered sheets from adjacent, folded signatures.

Figure 3:
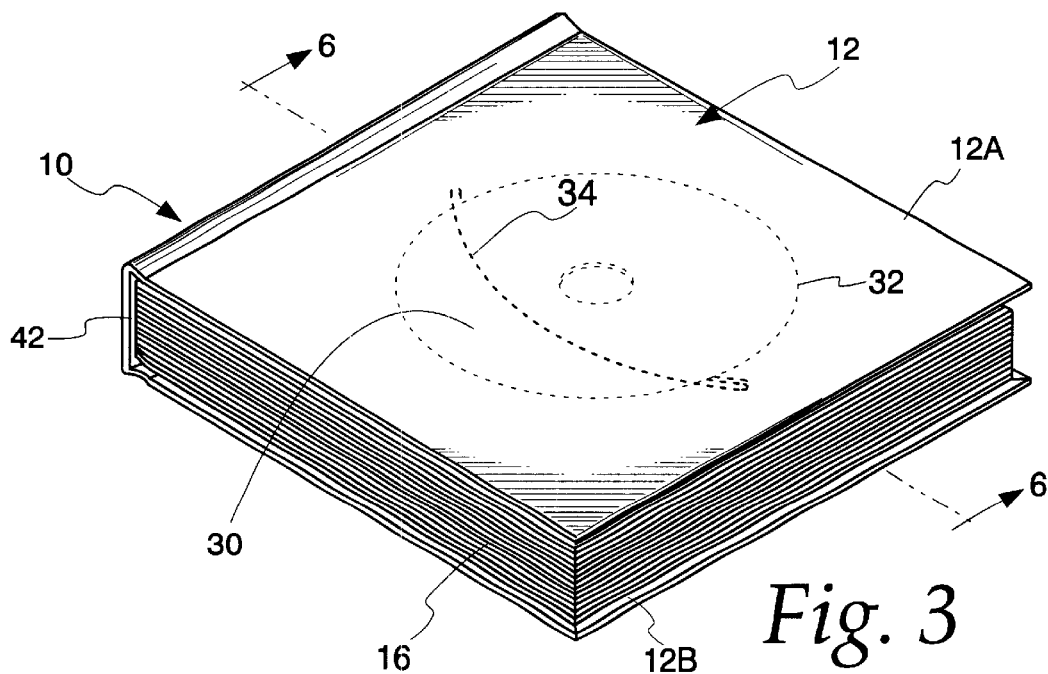
FIG. 3 is a perspective view of the book of FIG. 1 but is expanded in width because of the insertion of CDs into the pockets in the book.
Figure 4:
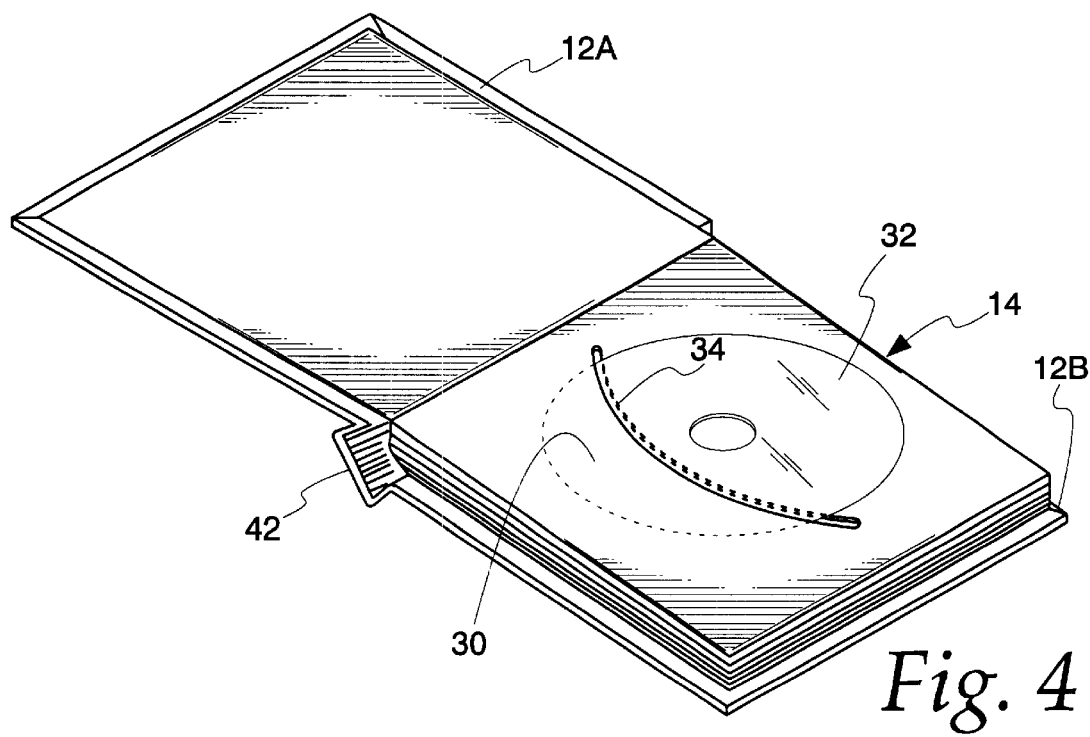
FIG. 4 is a view similar to FIG. 2 but with a CD in a pocket in the first page of the book.
Figure 5:
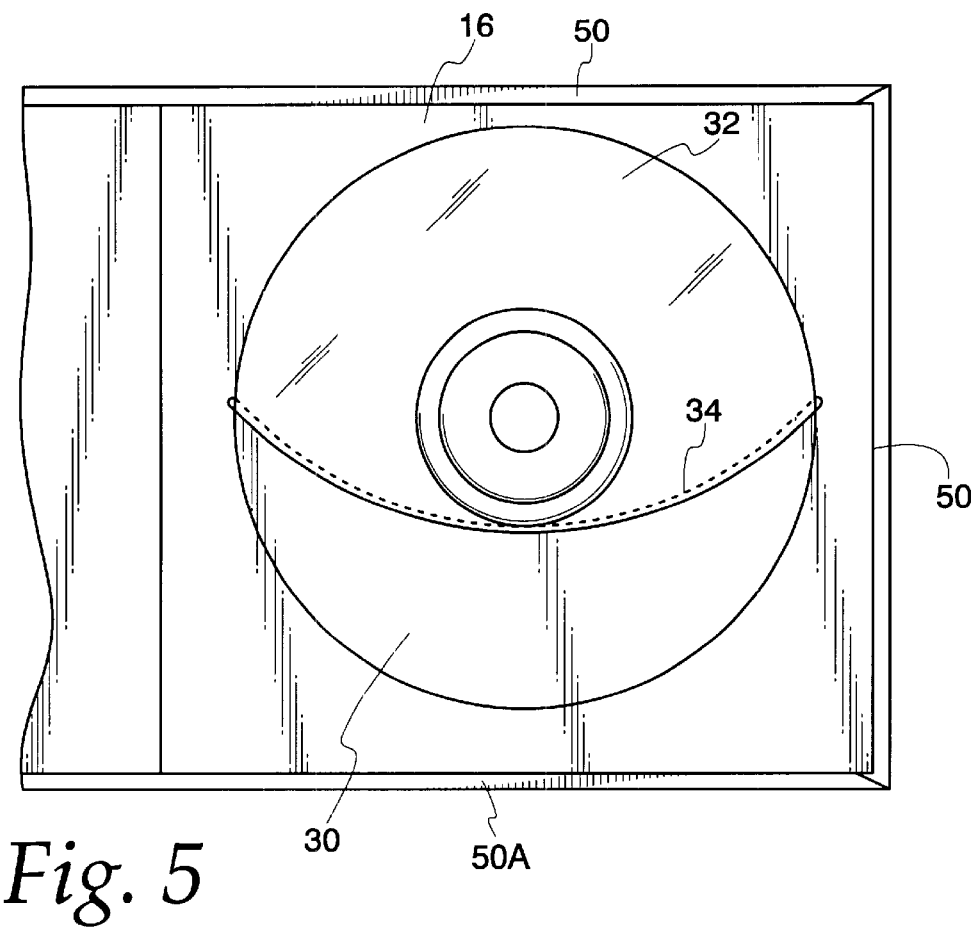
FIG. 5 is an enlarged plan view of a CD in a pocket.

In accordance with the present invention, the board book 10 is formed with a plurality of product-receiving pockets 30 holding a product, such as the CDs 32, as shown in FIGS. 3–5. Herein, the pockets 32 are formed with the entrance slit or slot 34 leading into a space between the signature sheets 20a and 20b of adjacent, folded signatures. As explained hereinbefore, the signature sheets 20a and 20b are adhered together by adhesive 24 and, in this instance, the adhesive pattern is a line 36a, 36b and 36c of adhesive about each of three exposed edges of signature sheet 20a. A fourth line of adhesive 38 is positioned adjacent the fold 20c in the signature. Because the slit 34 is in the signature sheet within the glue border (lines 36a, 36b, 36c and 38), the slit leads into an open space or pocket being defined between the sheets 20a and 20b of each board book page 16. That is, the slit 34 leads into a hollow space between the sheets 20a and 20b, which hollow space is bound by the four glued together portions of these sheets at the adhesive lines 36a–36c and 38. The glue lines 36a, 36b and 36c glue together the upper, lower and outer side edges of the two sheets 20a and 20b to form a closed, sealed edge about the book board page 16.

Figure 1:
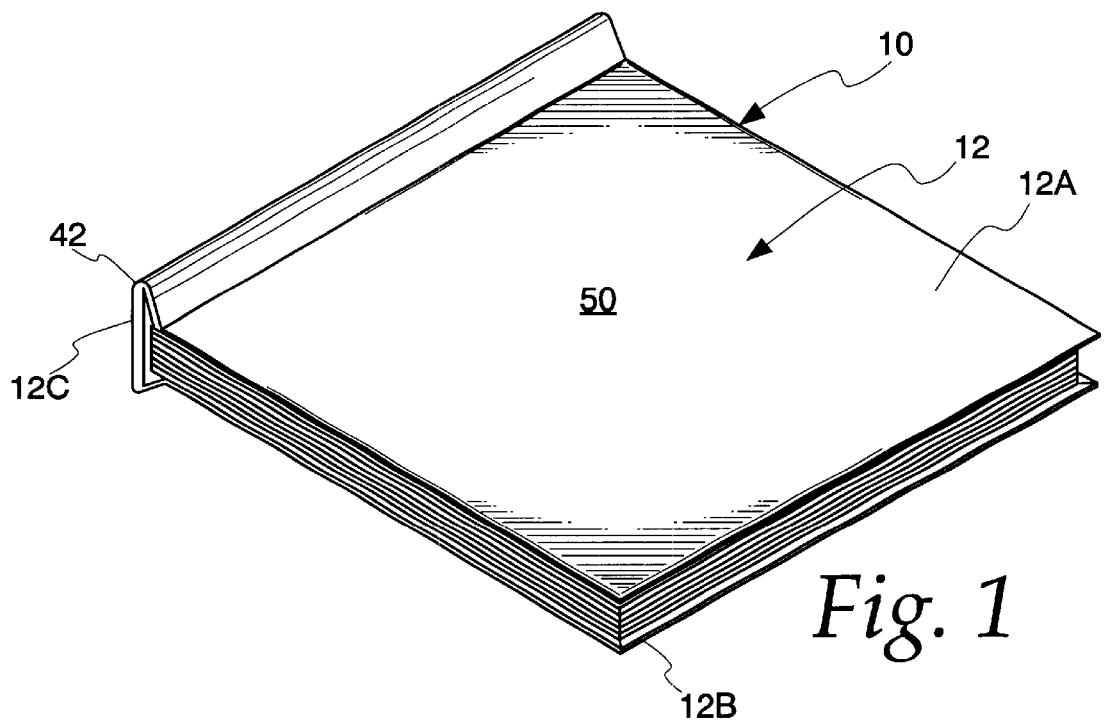
FIG. 1 is a perspective view of a compact disc book without discs therein and embodying the invention.
Figure 2:
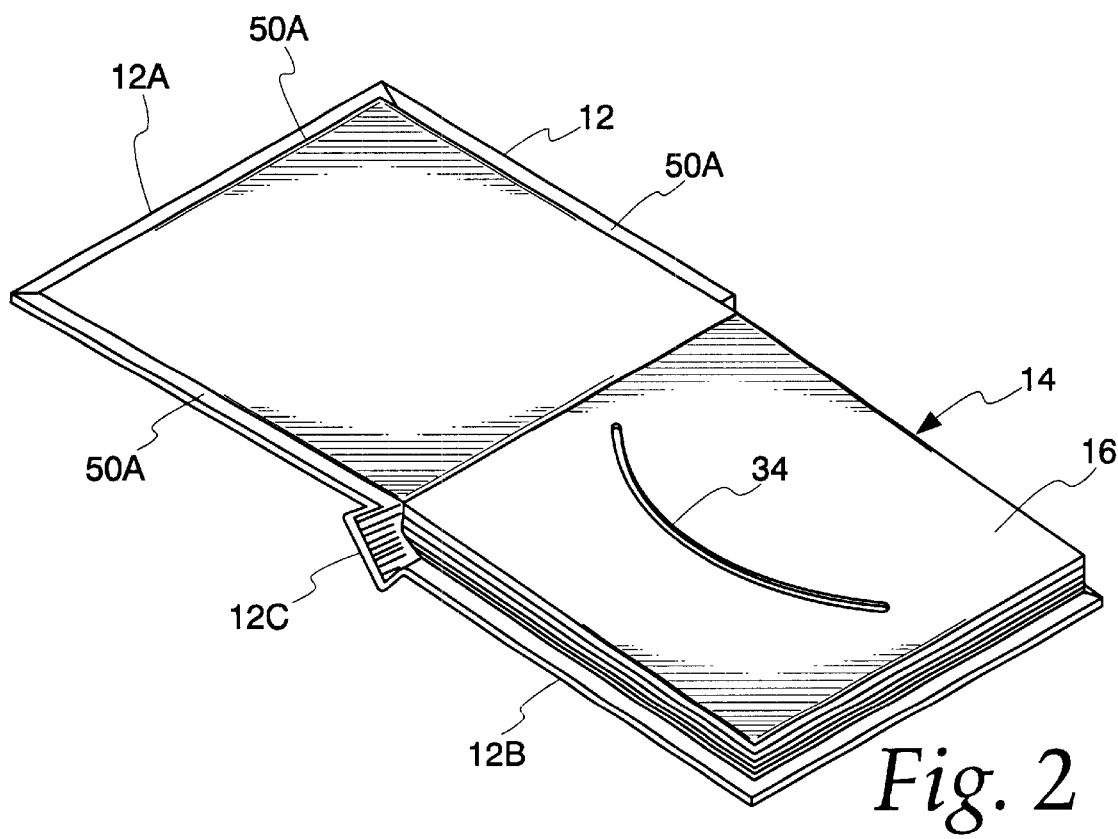
FIG. 2 is a perspective view of a front cover opened to expose a CD carrying page in the book of FIG. 1.

In accordance with an important aspect of the invention, the board book is expandable from its position of not having any CDs therein (FIG. 1) to its expanded position where it is filled as shown in FIG. 3. It will be appreciated that where the book has 15 to 20 CDs inside the book, that it should be capable of being expanded while keeping a nice, flat appearance with the front cover 12a being substantially in a plane parallel to the plane of the back cover 12b. To provide for the expansion of the thickness of the board book 10 as it is being filled with CDs, the backbone is preferably formed from signature folds 20c arranged in an accordion-like fashion, as best seen in FIG. 8, with fold edge areas or portions 40 being unglued. That is, the glue line 38, adjacent the fold line 20c, is spaced by an unglued strip area 40 intermediate the fold or crease line 20c and the adhesive line 38. This is unlike the usual board book wherein the adhesive covers the area 40 so that the sheets are glued together up to the fold. Herein, the outer cover is also made to be expandable along with the expandable cover spine 42, which changes from its unfilled, smaller position of FIG. 1 to its expanded filled position of FIG. 3. Thus, the CD board book has an attached, hard, protective cover 12 to protect the CDs in the pockets 30 of the board book pages 12.

Turning now in greater detail to the illustrated embodiment of the invention, the process used and described herein involves an automated process used to make board books; and it will be explained in connection with FIG. 12. The signature sheets 20 are printed as well as a case outer cover sheet 50 used when forming the cover 12, as indicated at station 51 (FIG. 12). After printing, the signatures are sent to a die cutting machine, such as a Bobst die cutter at a die cutting station 54, where the slot 34 is formed in the flat signature 20, as shown in FIG. 9. The slot in the signature sheet 20a portion of the signature is preferably arcuate in shape (FIG. 9) with a central space 34a between an upper edge 34b and a lower edge 34c of the slot. The illustrated slot 34 has upper ends 34e and 34f of equal height from the lower, central portion of the slot 34. The illustrated slot 34 is formed in the die cutter with waste being cut from the signature to form the space 34a; hence, the slot 34 is more than a mere slit where no scrap material is removed from the signature. The slot 34 serves as an entrance to the pocket. The pocket may take various forms; and the slot likewise may take various forms, particularly for products other than the thin, flat, circular CDs illustrated herein. The slotted signatures 20 are sent to a folding machine at a folding station 56 (FIG. 12) wherein the folding machine folds the signature in half to form the fold 20c and the two signature sheets 20a and 20b. The folding machine includes pressure rollers which press the sheets 20a and 20b tightly against one another to remove air therebetween and to crease the fold 20c. The folded signature sheets are now in a familiar signature shape to be sent to station 60 at which is located a conventional, signature-gathering machine.

The gathering machine typically has a large number of hoppers each assigned to receive a stack of one of the signatures of the sequence used to make up the book block. For example, the gathering machine may have 16 hoppers for depositing sixteen signatures in timed sequence to be gathered on the gathering conveyor to form the book block. Usually, only one side 20h (FIG. 10) of the signature has printing thereon. The other side 20j of the signature does not have printing thereon in this instance, although it could have printing thereon, if desired. As each signature is fed from a hopper of the gathering machine, it is fed past a gluing station, at which a glue applicator, such as a glue roller, applies a pattern of glue to the signature. Herein, the glue pattern comprises glue lines 36a, 36b, 36c and 38. Herein, the printed text is on inside surfaces 20h of the respective signature sheets 20a and 20b when in the V position shown in FIG. 10. The outer surfaces 20j and 20k of the respective signature sheets 20a and 20b are not printed because they are to be glued to an adjacent signature sheet to form the pockets 30.

If the two-folded signatures 20 (shown in FIG. 10) bore pages 1, 2, 3 and 4 of the book block, then the lefthand signature will have page 1 on its inner surface 20h of a sheet 20a; and page 2 will be facing it on inside surface 20h of page 20b. Page 3 of the text will be on inside surface 20h of sheet 20a of the right folded signature; and page 4 will be on the inside surface 20h of the signature sheet 20b of the right folded signature sheet 20b. The adhesive will have been applied, as shown in FIG. 10 to the outer sides 20j of the sheets 20a of each of the folded signatures. This adhesive is pressed against an outer side 20k of an adjacent sheet 20b of an adjacent, folded signature. Thus, the sides 20j of each of the sheets 20a having adhesive thereon, will be pressed against a facing side 20k of adjacent and preceding signature sheet 20b of a preceding, folded signature, thereby joining the signatures together into a book block 14 having a book backbone 18 defined by the folds 20d of the adhered signature sheets of the book.

If desired, after assembling the book block, it may be trimmed to size by a trimming machine to cut one or more edges from the book block at a book block trimming station 62 (FIG. 12). If no trimming is desired, then the case or cover 12 may be applied immediately to the book block 14 at a cover applying station 64. The manufacture of the preferred and illustrated case or cover 12 will be described below.

The illustrated cover 12 is formed with a harder and stiffer material, which is usually thicker than the stock of the signature. Herein, the cover is formed with three pieces of chip board including a central spine board 20 (FIG. 6) that is about ½ in width or greater and is connected to similar cover boards 71 and 72 by an outer printed case side sheet. At a cover-making station 59 (FIG. 12), the chip board for the cover is severed into three pieces including the front cover board 70, the spline board 71 and the back cover board 72. The front and back cover boards are identical in size. A case or cover-making machine, such as Horan FC.M. machine, applies glue to boards and adheres them to the outer case or cover sheet 50. The case cover sheet 50 covers the entire outer sides of the chip board pieces, and preferably has edged portions 50a (FIG. 5) folded over and adhered to the inner sides of the chip boards. The case cover sheet 50 has hinge portions 50b and 50c that join the spline piece 65 to the front and back cover pieces 66 and 67. The cover is folded over to form the book cover shape shown in FIGS. 1, 3 and 6.

The attaching of the book covers 12 to the book blocks (14) takes place in station 64 and is done with a machine. The first and last outer sides of the book block are adhered by adhesive to the inner sides of the cover side pieces 66 and 67 to attach the book block to the cover. The spline piece 65 is not attached to the accordion backbone of the book block, but is spaced therefrom to allow the book's backbone 18 to expand. The book block will be expanded as CDs are placed into the pockets 30 of the board book pages 16. Herein, the now-completed CD book is individually shrink-wrapped in plastic to protect the CD book and the CDs therein at a shrink wrap station 78. The shrink-wrapped CD books are then placed in cartons at a cartoning station 79 and shipped at a shipping station 80.

From the foregoing, it will be seen that there is provided a new and improved board book for products such as CDs. The CD board books can be made quickly and inexpensively on board book-making machines at high production rates to provide an inexpensive CD board book. The use of signature-gathering machines allows the fast formation of book blocks using signatures that are uniquely shaped to provide CD pockets therein. The provision of unglued strips, e.g., ¼ to ⅜ inch in width adjacent the folds in the signatures allows for an expandable backbone, which expands as CDs are placed in the pockets.

It will be appreciated that although various aspects of the invention have been described with respect to specific embodiments, alternatives and modifications will be apparent from the present disclosure, which are within the spirit and scope of the present invention as set forth in the following claims.

What is claimed is:

1. A CD board book for storing a plurality of compact discs, which are to be removed and returned to the board book, comprising:
   a cover having a front cover page and a rear cover page;
   a plurality of folded, separate interior signatures each formed from a folded sheet, the folded signatures being folded at an inner fold, the signatures being adhered to one another to define a book of multiple board pages disposed within the cover;
   a pocket formed between adjacent folded sheets of adjacent, interior signatures with each pocket to receive a CD therein;
   there being a plurality of pockets for holding the plurality of compact discs on the interior signatures;
   inner, adhered portions of adjacent, folded, signatures being adhered together adjacent the inner folds of the signature at a signature backbone for the book, unadhered portions of adjacent signatures comprising the pocket; and
   unadhered, inner folds of the folded signatures being adjacent the inner adhered portions and defining therewith an expandable signature backbone for the book, which backbone is expanded when a plurality of CDs are placed in the book.

2. A CD board book in accordance with claim 1 wherein the cover has an expandable cover with an expandable spine having therein the expandable folded backbone of the folded board pages when the book is opened to gain access to a CD.

3. A CD board book in accordance with claim 1 wherein each of the outer board pages has outwardly facing sides adhered to an inwardly adjacent facing side of the cover.

4. A CD board book in accordance with claim 1 wherein a slit is formed in one sheet of a board book page to serve as an entry for the CD into the pocket.

5. A CD board book in accordance with claim 1 wherein the slit is in the form of an arc with a lower portion of the arc being located centrally between upper ends of the arc.

6. A CD board book comprising:
   an outer cover for the book;
   a plurality of folded, board book pages formed of folded signatures, the folded signatures comprising at least two adjacent signature sheets and having at least one common, integral fold line joining the adjacent sheets together and having adjacent folds defining a backbone for the book;

adhered portions of the adjacent signature sheets of the folded pages being adhered to one another in a predetermined pattern to define a pocket between the sheets for receiving a compact disc therein;

the board book comprising board pages, one sheet of one signature sheet adhered to another adjacent sheet of another signature sheet to define a board sheet with the pocket being formed between the respectively adhered, adjacent sheets;

an expandable backbone formed by unadhered, inner folds and adjacent adhered portions of the adjacent signature sheets; and a CD in each of the pockets with the CDs being mounted in the board book and expanding the expandable backbone of CD board book.

7. A CD book in accordance with claim 6 wherein the cover includes a spine section having first and second pairs of parallel fold lines therein to define an expandable spine for the CD board book.

8. A CD board book in accordance with claim 6 wherein the pocket includes an arcuate entrance slit to allow insertion of a lower half of the CD into the pocket.

9. A CD board book in accordance with claim 6 wherein the pockets hold a lower portion of the CD with a top portion of the CD being located outside of the pocket.

10. A method of making a CD board book having board pages formed of adjacent sheets of folded signatures with pockets to receive CDs herein, the method comprising:

providing signatures with a slit therein to serve as a pocket entry into a pocket on a board page for receiving a CD;

folding the signatures on a folding machine to form at least one pair of sheets for each signature;

feeding the folded signatures from a signature gathering machine and gathering and collating the signatures by the gathering machine;

applying adhesive to the folded sheets in a predetermined pattern at the gathering machine to adhere one of the adjacent signature to another adjacent signature sheet to form board pages and to form a pocket between adjacent sheets of adjacent signatures;

securing folded sheets together to provide an expandable backbone between adjacent signature sheets, applying a cover and attaching the cover to the board pages; and inserting CDs through the slits in the signatures into the pockets of the respective board book pages and expanding the backbone.

11. A method in accordance with claim 10 including forming an expandable CD board book by leaving inner folds of adjacent signature sheets unadhered so that the unadhered folds may separate from each other and expand with insertion of CDs into the pockets.

12. A method in accordance with claim 10 including trimming of board book blocks to size prior to applying the cover.

13. A method in accordance with claim 10 including:

printing text on the signatures prior to folding the signatures; and slitting the signatures to form an entry slit to insert the CD into the pocket prior to being folded on a die cutter.

14. A method in accordance with claim 13 including:

cutting a case on a cutting machine to size; and attaching a cover material sheet to the case to complete the cover prior to attaching the cover to the book block.

* * * * *